UNITED STATES PATENT OFFICE 2,639,238

EFFERVESCENT DRINK CONCENTRATE

Joseph G. Alther, Evanston, and Prudence M. Van Arsdell, Chicago, Ill.

No Drawing. Application July 2, 1952, Serial No. 296,946

19 Claims. (Cl. 99—78)

This invention relates to inorganic carbonate compositions. More particularly, the invention relates to an inorganic carbonate complex stable, in the absence of water, in the presence of organic acids and the other dry ingredients of conventional confectionery drink concentrates. The invention also relates to effervescent drink concentrates containing such stable inorganic carbonate complexes.

There are known to the art numerous powdered and granulated concentrates for solution in water to prepare soft drinks. These prior art compositions essentially embrace combinations of an acid, such as citric acid, a carrier for the acid, food color, and a flavor. Conventional compositions of this type do not produce effervescent drinks.

Concentrates for producing effervescent therapeutical liquids, such as Alka Seltzer, are stabilized compositions of an acid and a carbonate which contain little or no sugar. When added to water, these pharmaceutical compositions evolve carbon dioxide at a high rate. The solution produced is predominantly saline and medicinal in taste. The effervescence is quickly dissipated. The mixture of ingredients of such pharmaceutical compositions is stable in the dry state.

In contrast with the aforementioned pharmaceutical compositions, it is known to the art that simple mixtures of carbonates, acids, and sugars are unstable, even though maintained substantially dry. When acids, carbonates, and sugars are combined and stored, chemical changes occur which dissipate the effervescent activity, color, and flavor thereof. The moisture of the atmosphere and the water of crystallization which is normally present in the sugars and acids is sufficient to initiate and maintain the degradation of the ingredients.

It is accordingly a primary object of this invention to provide an inorganic carbonate in the form of a complex which is stable, in the absence of added water, in the presence of an organic acid and a sugar.

It is a further object of the invention to provide a beverage concentrate embracing an inorganic carbonate complex and an organic acid or acid complex which, when added to water in conjunction with sugar and flavor, will produce highly palatable, healthful, and effervescent drinks.

It is a further object of the invention to provide an inorganic carbonate complex such that, when added to water in combination with an organic acid, there will be produced a delayed effervescence which is maintained throughout the time normally required for the consumption of the beverage so produced.

In accordance with the invention it has been discovered that a suitable inorganic carbonate complex can be produced by heating to a temperature of from about 80° F. to about 200° F., a mixture of a normally crystalline monosaccharide and an inorganic carbonate, containing from about 3% to about 15% by weight of water.

The inorganic carbonates and monosaccharides may be combined in a wide range of proportion to form the carbonate-monosaccharide complexes of this invention. Compositions containing from about 20% to about 95% by weight of monosaccharide are highly suitable. Preferably a mixture containing from about 50% to about 85% by weight of a monosaccharide with the balance carbonate is employed.

The inorganic carbonates are generically useful in the formation of the complexes of this invention. Alkali metal bicarbonates and particularly sodium bicarbonate are preferred. Carbonates and bicarbonates of the alkaline earth metals are also particularly suitable. Barium carbonates, which are poisonous, of course may not be employed in the formation of palatable beverage compositions. Carbonates of the various metals whose salts have been found to be therapeutically useful, such as strontium, magnesium, iron, and the like, can be employed.

The normally crystalline monosaccharides are generically operable in the invention. Glucose is preferred. The various crystalline tetroses, pentoses, ketohexoses, and aldohexoses are contemplated by this invention. Specifically, erythrose, threose, ribose, arabinose, lyxose, xylose, altrose, allose, mannose, galactose, talose, idose, fructose, tagatose, and sorbose can be employed.

It is critical to the production of the carbonate-monosaccharide complexes of this invention that the mixture from which the complexes are produced contain from about 3% to about 15% by weight of water.

If the monosaccharide-carbonate mixture employed as a starting material does not contain a minimum of about 3% of water, it has been discovered that the carbonate-monosaccharide complexes are not satisfactorily produced. If the mixture of monosaccharide and inorganic carbonate from which the complexes of the invention are produced contains more than about 15% by weight of water the resulting mixture, when heated, within the range claimed, is converted to a watery syrup which gives no substantial effervescence when admixed with organic acids and water.

It is preferred that the carbonate-monosaccharide mixtures from which the complexes of the invention are prepared contain from about 5% to about 10% by weight of water.

In a preferred form of the invention, the water of hydration of one or both of the reactants employed is availed of to supply part or all of the water requisite to the successful production of the carbonate-monosaccharide complexes. Thus, when commercial dextrose, which normally contains from about 3% to about 8% by weight of water of hydration, is utilized in the invention, it may be unnecessary that additional water be added to the reaction mixture.

It is critical to the invention that the mixture of monosaccharide, inorganic carbonate, and water be heated to a temperature within the range of from about 80° F. to about 200° F. The optimum maximum temperature is, of course, a function of the water concentration in the reaction mixture. Those skilled in the art will readily be able to determine the most desirable temperature for any particular reaction mixture it is desired to use. It is preferred that the complexes of the invention be prepared by heating a mixture of an inorganic carbonate, a monosaccharide, and water in the preferred proportions to a temperature of from about 100° F. to about 175° F. It will be appreciated by those skilled in the art that the optimum time of heating requisite to the formation of the carbonate-monosaccharide complexes of this invention will vary inversely with the temperature.

At the upper limit of the temperature range, heating of the monosaccharide-carbonate-water mixture for a period of about 5 minutes is sufficient, whereas at lower temperatures longer periods of time, up to about 50 minutes, may be required. Those skilled in the art will experience no difficulty in determining the most appropriate time-temperature relationship for any particular reaction mixture.

The formation of the desired complex is evidenced by deepening in color of the mixture when conventional food dyes are present, and by the fact that the individual crystalline components of the mixture from which the complex is formed lose their identity. It is apparent that some surface reaction takes place at the crystalline inner faces of the materials present in the reaction mixture.

When the preferred monosaccharide, glucose, or dextrose is utilized, it is considered that isomerization of the dextrose to the ketose or levulose form takes place in the process of the invention. Apparently the small amount of moisture which is present in the reaction is adequate to permit sufficient ionization of the carbonate present to initiate the isomerization reaction on the crystalline inner faces only of the dextrose-carbonate mixture. The solubility of the dextrose-carbonate complex of the invention is somewhat greater than that of either the dextrose or the carbonate alone.

When the preferred temperature range is utilized it is preferred that the heating be carried on for a period of about 10 to about 25 minutes.

The heated reaction mixture of monosaccharide and carbonate is preferably dried substantially immediately subsequent to the heating operation. It is additionally desirable to screen the reaction mixture through a sieve of appropriate mesh size to separate the granules and impart uniformity to the product.

It is advantageous to heat the reaction mixture in a substantially inert atmosphere to preclude adverse oxidation of the reactants and color change which might otherwise occur as a consequence of the presence of the carbonate.

The following examples are illustrative of the preparation of carbonate-monosaccharide complexes in accordance with this invention:

Example I

This example embodies a series of experiments in which like sodium bicarbonate-dextrose mixtures containing varying quantities of moisture were heated for varying periods of time in an oven maintained at a temperature of 270° F. to 290° F.

The basic mixture employed in each of the following described experiments consisted of about 50 g. of commercial dextrose, containing about 6% by weight of water of hydration, 2 g. of anhydrous sodium bicarbonate, and 0.1 g. of powdered dye. The basic mixture accordingly contained about 3 g. or 5.8% by weight of water.

In experiment 1 the above-mentioned dry mixture of hydrated dextrose, sodium bicarbonate, and dye was heated in an oven maintained at a temperature of 270° F. to 290° F. for about 35 minutes. After about 25 minutes a satisfactory granular product was obtained. The quality of this product was not adversely affected by heating for an additional 10 minutes. The product, when admixed with citric acid and added to water, demonstrated excellent effervescence. The reaction mixture reached the minimum critical temperature of about 80° F. after about 15 minutes and a maximum temperature of about 140° F.

In experiment 2 there was added to the aforementioned dry reaction mixture water requisite to afford a concentration of about 7% by weight thereof. Satisfactory granules were formed after about 25 minutes heating. The temperature of the reaction mixture reached the minimum of 80° F. after about 5 minutes heating and a maximum temperature at the end of the heating step of about 105° F. The product obtained after 35 minutes heating demonstrated good effervescence when added to water in conjunction with citric acid and was analogous to the product of experiment 1.

Experiment 3 was carried out in a manner similar to experiment 1 with the exception that there was added to the reaction mixture water requisite to provide a concentration of about 10% by weight thereof.

In experiment 3 satisfactory granules were formed after about 10 minutes heating. The temperature of the reaction mixture reached the minimum of 80° F. after about 3 minutes heating and a maximum temperature at the end of the heating step of about 95° F. The product so obtained demonstrated good effervescence in water containing citric acid and was analogous to that resulting from experiment 1.

Experiment 4 was carried out in a manner analogous to experiment 1 with the exception that water was added to the dry reaction mixture in an amount requisite to provide 16% by weight thereof.

Satisfactory complexes could not be produced from this reaction mixture.

The foregoing experiments clearly demonstrate the interrelationship of a water concentration in the reaction mixture and the heating time to which the mixture is subjected. The experiments further demonstrate that the use of water concentrations in excess of the upper limit of about 15% by weight in the reaction mixture precludes the formation of the inorganic carbonate complexes which are contemplated by the invention.

Example II 85 g. of anhydrous dextrose, 10 g. of potassium bicarbonate, and 10 g. of water were thoroughly mixed and heated to a temperature of about 125° F. for about 10 minutes.

An excellent granular product is obtained which demonstrates substantial effervescence when added to water in conjunction with citric acid. The above-described reaction was repeated with the exception that there was employed in the reaction mixture only 4 g. of water. The reaction mixture was heated to a temperature of about 195° F. for about 5 minutes. A product analogous to that above-described was obtained.

Example III

Example II is repeated with the exception that threose is substituted for dextrose. A product analogous to that described in Example II is obtained. A like product is obtained when d-erythrose is substituted for dextrose in Example II.

Example IV

The process of Example II is repeated with the exception that the reaction mixture is heated to a temperature of about 125° F. for about 5 minutes. A product analogous to that described in Example II is obtained.

Example V

The process of Example II is repeated with the exception that xylose is substituted for dextrose and the reaction mixture is heated to a temperature of about 150° F. for about 6 minutes. A granular product is obtained which demonstrates substantial effervescence when added to water in conjunction with citric acid.

Example VI

The process of Example II is repeated with the exception that sorbose is substituted for dextrose. A somewhat analogous product is obtained which demonstrates excellent effervescent properties. Due to the physical characteristics of sorbose the product of this example is somewhat more sticky and less granular in character than the product of Example II.

Example VII 35 g. of anhydrous calcium carbonate, 60 g. of dextrose containing about 6% by weight of water, and 5 g. of water were mixed with 0.2 g. of red food dye and heated to a temperature of about 140° F. for a period of about 15 minutes.

A granular product is obtained which demonstrates excellent efferverscence when admixed with citric acid and added to water.

The product when stored in admixture with citric acid is stable over an extended period of time.

The complexes of this invention are stable in the presence of sugars and organic acids, particularly citric acid, tartaric acid, malic acid, and the like, which are conventionally used in food preparations. The composition of the invention therefore may appropriately be combined with such acids in the production of beverage concentrates.

The compositions of the invention may also appropriately be combined with disaccharide-organic acid complexes of the type disclosed and claimed in copending application Serial No. 140,159, filed January 23, 1950, now Patent No. 2,603,569. Briefly stated, such disaccharide-organic acid complexes may be prepared by raising the temperature of a mixture of an organic acid and a disaccharide containing water in an amount equal to about 5% to about 15% by weight of the acid present to a temperature of about 125° F. to about 250° F. The preferred disaccharide is sucrose and the preferred organic acid is citric acid for the purposes of preparing an effervescent beverage concentrate.

The following are exemplary of beverage concentrates of the type embraced by this invention:

Example VIII

A mixture of citric acid, 21 g., and the dextrose-potassium bicarbonate complex produced in accordance with Example II, 24 g., is prepared. To this mixture may be added flavor, sugar, and coloring.

Example IX

A sodium bicarbonate-dextrose complex of the type produced in accordance with experiment 1 of Example I is blended with 20% by weight of citric acid to produce an effervescent beverage concentrate to which color, flavor, and sugar may appropriately be added.

As a general rule, satisfactory beverage concentrates are produced when the carbonate-monosaccharide complexes of this invention are blended with from about 12% to about 24% by weight of an acid such as citric acid, or with an amount of an acid complex requisite to supply such a concentration of citric acid when the concentrate is dissolved in water.

It has further been discovered that there may be produced a monosaccharide-organic acid complex which is suitable for combination with the carbonate-monosaccharide complexes with which this invention is specifically concerned.

Such monosaccharide-organic acid complexes may appropriately be prepared by heating a mixture of a monosaccharide and an organic acid in the presence of a small amount of water to a temperature of from about 80° F. to about 150° F. A preferred range is from about 90° F. to about 130° F.

It is essential to the production of the monosaccharide-organic acid complexes that the dry mixture from which such complexes are prepared contain from about 5% to 15% by weight of water. The requisite water may be present either as water or crystallization in the reactants or as added water, or both.

In like manner, the formation of the carbonate-monosaccharide complexes, the appropriate heating time requisite to the formation of the monosaccharide-organic acid complexes may readily be determined by those skilled in the art. The final product takes the form of a granular material having marked stability in the presence of carbonates and characterized by excellent water solubility.

It is preferred in the production of the monosaccharide-organic acid complexes that the mixture from which such complexes are prepared be heated to a temperature of 90° F. to 130° F., for a period of from about 20 minutes to about 35 minutes.

The monosaccharides are generically operable in the formation of the monosaccharide-acid complexes. All of the various monosaccharides heretofore mentioned as being useful in the preparation of the carbonate complexes can, in like manner, be employed in the formation of the acid complexes. Dextrose or glucose is preferred.

All of the various organic acids can be employed in the invention. Crystalline organic acids and specifically citric acid, tartaric acid, malic acid, and lactic acid are preferred.

*Example X*

A mixture of citric acid and dextrose containing about 5% by weight of water and about 20% by weight of citric acid was heated to a temperature of about 100° F. for a period of about 25 minutes. A crystalline dextrose-acid complex was obtained, useful in conjunction with the carbonate complexes of this invention in the formation of confectionery beverage concentrates.

Like results are obtained when tartaric and lactic acid are substituted for citric acid. Like results are also obtained when the various crystalline monosaccharides are substituted for dextrose.

In the formation of confectionery beverages from the carbonate complexes of this invention, it is desirable to incorporate therein food flavors and sugar.

Flavored sugars prepared in accordance with the method described in the aforementioned application Serial No. 140,159, now Patent No. 2,603,569, are highly suitable for use in such compositions. Monosaccharide - sugar - color - flavor compositions may be prepared in a manner analogous to that described for similar disaccharide compositions in application Serial No. 140,159, now Patent No. 2,603,569.

This application is a continuation-in-part of application Serial No. 140,159, now Patent No. 2,603,569, the entire disclosure and claims of which are expressly incorporated herein by reference.

We claim:

1. A process for producing an inorganic carbonate-monosaccharide complex which comprises heating to a temperature of from about 80° F. to about 200° F. a mixture of a normally crystalline monosaccharide and an inorganic carbonate containing from about 3% to about 15% by weight of water.

2. The process of claim 1 in which the monosaccharide-inorganic carbonate mixture is heated to a temperature of about 100° F. to about 175° F.

3. The process of claim 1 wherein the monosaccharide-inorganic carbonate mixture is heated for a period of about 10 minutes to about 25 minutes.

4. The process of claim 1 in which the water present in the reaction mixture is at least in part water of hydration of the reactants.

5. The process of claim 1 in which the monosaccharide-inorganic carbonate mixture contains from about 5% to about 10% by weight of water.

6. The process of claim 1 in which the inorganic carbonate is sodium bicarbonate.

7. The process of claim 1 in which the monosaccharide is dextrose.

8. The process of claim 1 in which the monosaccharide-inorganic carbonate mixture contains about 20% to about 95% by weight of monosaccharide.

9. An inorganic carbonate - monosaccharide complex produced according to the method of claim 1.

10. A sodium bicarbonate-dextrose complex produced according to the method of claim 1.

11. An effervescent beverage concentrate containing as essential ingredients an organic acid and an inorganic carbonate-monosaccharide complex, said complex being produced by heating to a temperature of from about 80° F. to about 200° F. a mixture of a normally crystalline monosaccharide and an inorganic carbonate containing from about 3% to about 15% by weight of water.

12. The effervescent beverage concentrate of claim 11 in which the organic acid is citric acid.

13. The effervescent beverage concentrate of claim 11 in which the inorganic carbonate-monosaccharide complex is a sodium bicarbonate-dextrose complex.

14. An effervescent beverage concentrate comprising a mixture of an inorganic carbonate-monosaccharide complex and an organic acid-monosaccharide complex, said inorganic carbonate-monosaccharide complex being produced by heating to a temperature of from about 80° F. to about 200° F., a mixture of a normally crystalline monosaccharide and an inorganic carbonate containing from about 3% to about 15% by weight of water; said monosaccharide-organic acid complex being produced by heating to a temperature of 90° F. to 150° F. a mixture of a normally crystalline monosaccharide and an organic acid in the presence of a small amount of water.

15. The effervescent beverage complex of claim 14 in which the inorganic carbonate-monosaccharide complex is sodium bicarbonate-dextrose complex and in which the organic acid-monosaccharide complex is a citric acid-dextrose complex.

16. An effervescent beverage concentrate comprising a mixture of an inorganic carbonate-monosaccharide complex and an organic acid-disaccharide complex; said inorganic carbonate-monosaccharide complex being produced by heating to a temperature of about 80° F. to about 200° F. a mixture of a normally crystalline monosaccharide and an inorganic carbonate containing about 3% to about 15% by weight of water; said organic acid-disaccharide complex being produced by raising the temperature of the mixture of an organic acid and a disaccharide containing water in an amount equal to about 5% to about 15% of the weight of the acid present to a temperature of about 125° F. to about 250° F.

17. The effervescent beverage concentrate of claim 16 in which the inorganic carbonate-monosaccharide complex is a sodium bicarbonate-dextrose complex and in which the inorganic acid-disaccharide complex is a citric acid-sucrose complex.

18. The process of claim 1 in which the monosaccharide-inorganic carbonate mixture contains about 50% to about 85% by weight of monosaccharide.

19. The process of claim 1 wherein the inorganic carbonate comprises sodium bicarbonate, and the monosaccharide comprises dextrose.

JOSEPH G. ALTHER.
PRUDENCE M. VAN ARSDELL.

References Cited in the file of this patent
UNITED STATES PATENTS

| Number | Name | Date |
|---|---|---|
| 109,990 | Zinsser | Dec. 6, 1870 |
| 169,830 | Mussgiller et al. | Nov. 9, 1875 |
| 362,727 | Divine | May 10, 1887 |
| 362,728 | Divine | May 10, 1887 |
| 1,450,865 | Pelc | Apr. 3, 1923 |
| 2,603,569 | Alther | July 15, 1952 |